United States Patent [19]

Scragg

[11] 4,212,373

[45] Jul. 15, 1980

[54] DOSING A FLOWING FLUID

[76] Inventor: Edgar P. Scragg, 60 Mulder St., Florida Park Extension 3, Florida, Transvaal, South Africa

[21] Appl. No.: 939,927

[22] Filed: Sep. 6, 1978

[30] Foreign Application Priority Data

Sep. 21, 1977 [ZA] South Africa ....................... 77/5656

[51] Int. Cl.[3] ................................................ F16N 7/34

[52] U.S. Cl. .................................. 184/56 A; 141/330; 222/89

[58] Field of Search ..................... 184/55 A, 55 R, 54, 184/56 R, 56 A, 57, 58, 39; 222/81-83, 83.5, 88-90; 141/329, 330

[56] References Cited

U.S. PATENT DOCUMENTS

| | | | |
|---|---|---|---|
| 1,241,352 | 9/1917 | Doering et al. | 141/330 X |
| 2,693,418 | 11/1954 | Smith | 141/329 X |
| 2,733,836 | 2/1956 | Switzer | 222/82 |
| 3,077,078 | 2/1963 | Hamilton | 222/82 X |
| 3,166,096 | 1/1965 | Lang | 222/386.5 X |
| 3,343,724 | 9/1967 | Malpos | 222/90 |
| 3,724,601 | 4/1973 | Scragg | 184/56 A |
| 3,788,369 | 1/1974 | Killinger | 141/330 X |
| 3,991,912 | 11/1976 | Soto | 222/81 X |
| 4,040,389 | 8/1977 | Walters | 222/81 X |
| 4,076,147 | 2/1978 | Schmit | 222/89 |

FOREIGN PATENT DOCUMENTS

| | | | |
|---|---|---|---|
| 2353010 | 4/1975 | Fed. Rep. of Germany | 222/90 |
| 1317297 | 12/1961 | France | 141/330 |

*Primary Examiner*—David H. Brown

*Attorney, Agent, or Firm*—Ladas & Parry

[57] ABSTRACT

A device for dosing a flowing fluid including a cylindrical casing which can be opened and which has an inlet at one end and an outlet at the other. A cylindrical liner is within the casing, there being a perforated wall at the inlet end of the liner. The outlet end of the liner is partly closed by a plate fixed to the casing. A spike having a shank and a head is fixed to the plate, the head being within said liner and the shank passing through the plate. A bore passes through the shank and emerges through a conical surface of the head. There is an annular shoulder between the shank and the head. An additive cartridge comprises a bag and an element including a sleeve through which the spike passes when the cartridge is impaled on the spike. The element includes a flange for co-operation with said shoulder to prevent accidental removal of the cartridge from the spike.

15 Claims, 8 Drawing Figures

DOSING A FLOWING FLUID

This invention relates generally to the dosing of a flowing fluid with an additive.

The art of dosing a flowing fluid with an additive is most developed in the field of airline lubricators and a recent development in this field is disclosed in Applicant's own U.S. Pat. No. 3,724,601.

The lubricant cartridge disclosed in this prior patent includes a nozzle structure having a metering bore which is initially closed. Immediately prior to use, a small tip of the nozzle structure is cut-off to open the metering bore. This minimises the possibility that the metering bore will be blocked by particles in the dusty conditions prevailing. Applicant has found, since his earlier invention has been put into use, that many unskilled men, once they have cut off the tip which blocks the metering bore, cannot accept that the bore is big enough for lubrication purposes. They thus gouge it wider with a nail or other implement. This is possible because the nozzle structure is moulded in synthetic plastics material. The immediate result, when the lubricator is placed in use, is over lubrication of the machine to which air is being fed followed by lubricant starvation with the possibility of damage resulting.

In the conditions existing in a mine, advantages arising from the ability to prepackage the lubricant in cartridges are very substantial. If the lubricant is not prepackaged then either the lubricators must be brought to a filling depot (which may be above or below ground) or a supply of lubricant must be taken to the lubricators. Disconnection of the lubricators from the air hoses after each shift can result in damage to the connecting threads. Furthermore, it is not particularly convenient to carry a drum or other bulk supply of lubricant to the working zones.

Applicant has sought a way of retaining the concept of prepackaging the lubricant while overcoming the problems which have arisen during use of his prior invented lubricator.

According to one aspect of the present invention there is provided, in combination, a device for dosing a flowing fluid with an additive and an additive cartridge, the device comprising a casing having an inlet for fluid to be dosed and an outlet for dosed fluid, a spike within the casing, the spike having a shank and a head and there being a metering bore passing through the shank and into the head, the bore opening through the surface of the head and the additive cartridge being impaled on the spike, the cartridge including a bag containing the additive and an element including a sleeve-like portion which receives the spike, and the spike and element including inter-engaging surfaces for securing the cartridge against accidental removal from the spike.

The bore, being in a component which will normally be of metal, cannot be gouged out even if the user thinks that it is very fine.

Applicant is aware that the lubricator disclosed in United States specification No. 3 116 096 includes a plastics membrane forming a bag which is impaled on a barb.

According to another aspect of the present invention there is provided a device for dosing a flowing fluid with an additive, the device comprising a casing having an inlet for flowing fluid to be dosed and an outlet for dosed fluid, a spike within the casing, the spike having a shank and a head, there being a metering bore passing through the shank and into the head, the bore opening through the surface of the head, and an annular shoulder encircling the spike where a shank joins the head.

The shank can be mounted on a plate which forms one end wall of a liner located within the casing, there being a gap between the liner and the casing which gap forms the main fluid flow path through the device. The casing and liner can both be cylindrical, said gap being cylindrical, and said plate can be disc-like with an annular gap between its outer periphery and the inner wall of the liner. The other end of the liner can be closed by a perforated plate.

A sealing plate can encircle the shank and a spring can be provided for urging the sealing plate towards the shoulder.

Said metering bore can comprise an axial bore passing through the shank and into the head and a passage intersecting said axial bore and opening through the surface of said head, the intersection between the axial bore and the passage being closer to the point of the head than the inlet to the passage on the surface of the head.

According to yet another aspect of the present invention there is provided a cartridge which comprises a bag for containing additive and an element secured to the bag, the element including a sleeve for receiving and guiding a spike onto which the cartridge is impaled during use.

In one form of the cartridge, the sleeve is open at both ends, there being a radially inwardly directed flange, which can be continuous or discontinuous, at the end of the sleeve remote from the bag. The element can further include a disc-like portion to which the bag is secured along a circular line which encircles the sleeve, the material forming the wall of the bag extending across the bore of the sleeve.

In a modified form, there is a transverse wall forming part of said element, the transverse wall being intermediate the ends of the sleeve. The bag can be secured to a peripheral flange which encircles the outer edge of said disc-like portion.

In a still further form, said sleeve can be provided, at the end thereof remote from said bag, with a sealing portion of frusto-conical form for co-operation with a similarly shaped surface of a spike on which the cartridge is impaled.

According to a further aspect of the present invention there is provided a method of dosing a flowing fluid which comprises the steps of:

(a) Impaling an additive cartridge comprising a bag secured to an element which element includes a sleeve on a spike by passing the spike through said sleeve so that the spike penetrates the cartridge;

(b) Providing on said sleeve and said spike co-operating surfaces which inter-engage to restrain the cartridge against accidental detachment from the spike;

(c) Placing the spike and cartridge within a casing having an inlet for fluid to be dosed and an outlet for dosed fluid;

(d) Causing flowing fluid to impinge on the bag so as to flatten the bag and thereby force additive from the bag through an outlet path provided therefor through said spike.

For a better understanding of the present invention, and to show how the same may be carried into effect, reference will now be made, by way of example, to the accompanying drawings in which.

Figure 1:
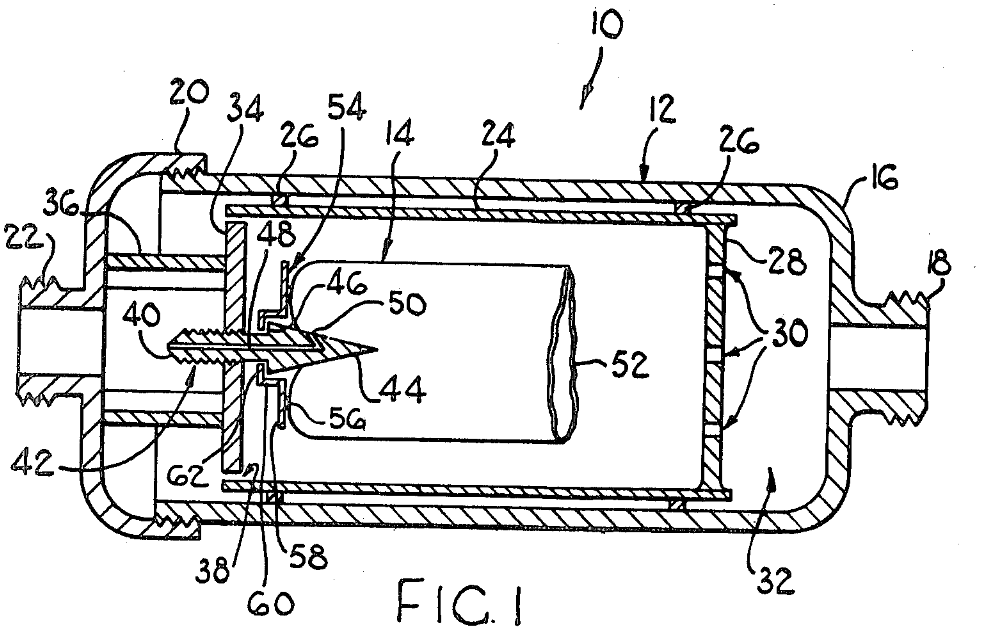
FIG. 1 is an axial section through a device for dosing a flowing fluid with an additive.

Referring firstly to FIG. 1, the device illustrated is generally referenced 10 and is intended primarily for dosing with a lubricant an air stream flowing to a piece of pneumatic apparatus such as a rock drill. The device comprises a body 12 within which there is a removable cartridge 14 which contains the additive. The body 12 comprises a main casing 16 having an air inlet connection at 18 and a cap 20 which is screwed onto the body 12. An outlet 22 is formed in the cap and it is through this outlet that air having lubricant entrained therein exits from the device.

An inner liner 24 is located co-axially within the body 12. Two or more sets of circumferentially spaced ribs 26 on the liner 24 maintain the liner in spaced relationship with respect to the body 12. The cylindrical space between the liner 24 and the internal wall of the body 12 constitutes the main air flow path through the device.

The end of the liner 24 adjacent the air inlet connection 18 has an end wall 28 therein. The liner 24 and the end wall 28 are preferably an integral moulding but the end wall can be secured in the liner or be a push-fit therein if desired. The end wall has a plurality of apertures 30 therein and, if desired, an air filter can be provided in the chamber 32 which is between the air inlet connection 18 and the end wall 28. This filter has not been shown.

A plate 34 forming the other end wall of the liner 24 is secured to the end cap 20 by means of a number of circumferentially spaced posts 36. The plate 34 is circular in form and there is an annular gap between the outer periphery of the plate 34 and the inner periphery of the liner 24. Air which has entered the liner through the apertures 30 escapes through this annular gap which has been referenced 38.

The plate 34 has a threaded aperture at the centre thereof and the threaded shank 40 of a spike 42 is screwed into this central aperture. The spike 42 projects into the liner 24 and, in addition to its shank 40, includes a pointed head 44. Where the shank and the head merge there is an annular shoulder 46 which, as will be explained, forms a cartridge retaining surface and, in some forms of the invention, a sealing surface. A metering bore passes through the shank 40 and through part of the head 44 to emerge through the conical surface of the head 44. The metering bore comprises an axial bore 48 which communicates with one or more passages 50 which extend radially with respect to the longitudinal axis of the spike 42. It will be noted that the passage 50 intersects the bore 48 at an acute angle so that the point of intersection of the bore and the passage is closer to the point of the head than is the inlet to the passage 50 on the conical surface of the head 44.

The lubricant cartridge 14 comprises a bag 52 of synthetic plastics material and an element 54 which is heat sealed to the bag 52 along a circular sealing line 56. The element 54 includes a disc-like portion 58 and, at the centre of the disc-like portion 58, a short cylindrical sleeve 60. At the end of the sleeve 60 remote from the portion 58 there is a radially inwardly directed flange 62.

In use of the device, the air inlet connection 18 is connected to a source of air under pressure and the outlet 22 is connected to the rock drill or other piece of pneumatic apparatus. With the air supply shut-off, the cap 20 is unscrewed from the body 12. As the cap 20 is moved away from the body 12, the structure comprising the posts 36, plate 34 and spike 42 is withdrawn from the body together with any cartridge 14 which is impaled on the spike in the way illustrated. After any such used cartridge 14 has been removed from the spike, the point of the head 44 is pushed through the central opening defined by the flange 62 of a fresh cartridge. When approximately half of the length of the head 44 has passed through the central opening bounded by the flange 62, the conical surface of the head 44 engages the flange 62 and thereafter the flange 62 is progressively forced outwards, the sleeve 60 deforming to permit such movement. When the rear end of the head 44 passes the flange 62, the resilience of the material of the sleeve 60 causes the flange 62 to snap inwardly behind the shoulder 46. Subsequently, only a pull on the cartridge 14 sufficient to deform the flange 62 outwardly can detach the cartridge from the spike.

During passage of the head 44 through the opening defined by the flange 62, the tip of the head encounters the portion of the wall of the bag 52 which is encircled by the sealing line 56. This portion of the wall has very little, if any, freedom of movement. Consequently, the pointed tip of the head 44 punctures the wall and the head 44 slides into the bag 52. The position of the passage 50 is such that, when the flange 62 snaps into position behind the shoulder 46, the portion of the wall of the bag 52 which encircles the aperture made therein by the spike 42 is located between the passage 50 and the shoulder 46. Thus the passage 50 is in communication with the interior of the bag and the wall of the bag grips the conical surface of the head 44 tightly. This provides a seal to minimise leakage of additive from the interior of the bag into the annular zone defined between the bag and the disc-like portion 58.

The cartridge 14 is then lowered, on the spike 42, into the liner 24 and the cap 20 subsequently screwed onto the body 12 to reclose the body.

When air under pressure is supplied through the inlet connection 18, the bulk of this air flows through the cylindrical space between the body 12 and the liner 24 to the space encircling the posts 36 and then, via the gaps between the posts, to the outlet 22. A portion of the air flowing to the body passes through the apertures 30 and impinges on the bag 52. The pressure exerted on the bag thus tends to collapse the bag and the additive contained within the bag is forced through the passage or passages 50 to the axial bore 48 from which it emerges on the downstream side of the plate 34.

Where the lubricant emerges from the axial bore 48, there is considerable air turbulence due to the fact that air is flowing to the outlet 22 through a circumferentially extending array of ports bounded by the posts 36. This turbulence has the effect of scattering the droplets of additive emerging from the bore 48 thereby to improve distribution of the additive in the air stream. As shown, the shank 40 is extended towards the outlet 22 so as to place the exit from the bore 48 in the region of greatest turbulence. The forces acting on the bag 52 are partially due to static pressure within the liner 24 but more significantly are due to the kinetic energy of the air impinging on the bag.

By varying the magnitude of the annular gap 38, the rate of air flow through the liner can be controlled and this in turn influences the feed rate of additive.

As the spike 42 passes through the wall of the bag 52, a wiping action is exerted by the wall on the head 44. This has the effect of wiping off the spike any dirt particles which may have been deposited thereon. The angled location of the passage or passages 50 ensures that any such particles tend to be swept past the entrances to the passages 50 and not into these passages. This arrangement minimises the possibility of deposited dirt particles blocking the passage or passages 50.

Figure 2:
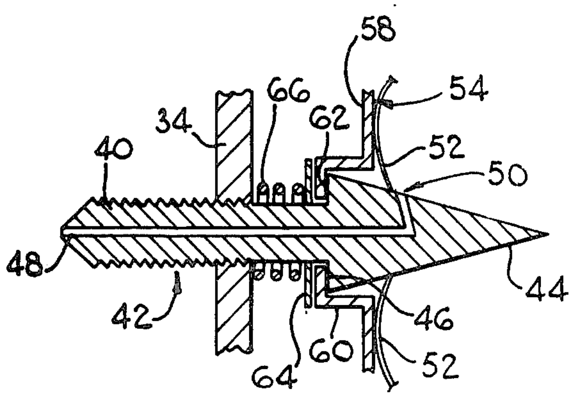
FIG. 2 is a fragmentary axial section, to a larger scale, showing a modified form of the device of FIG. 1.

In the modifiec form shown in FIG. 2, an annular sealing plate 64 encircles the spike 42 and a spring 66 urges the plate 64 towards the shoulder 46 and hence against the flange 62 of a cartridge impaled on the spike 42. Face-to-face contact between the flange 62 and the shoulder 46 and between the plate 64 and the flange 62 provides two sealing zones, in addition to the zone where the bag 52 engages the spike 42, to minimise leakage of additive from the bag 52.

Figure 3:
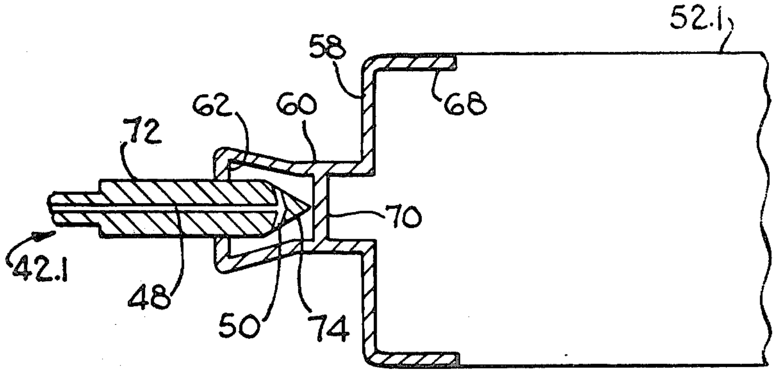
FIG. 3 is a fragmentary view showing a further form of dosing device.

Turning now to FIG. 3, this illustrates a further form of additive cartridge and a somewhat modified form of spike. The bag 52.1 of FIG. 3 is generally cylindrical in form and is heat sealed to a cylindrical flange 68 which encircles the outer periphery of the disc-like portion 58. The passage through the short cylindrical sleeve 60 is closed by a transverse wall 70 and the spike 42.1, in this form, has a generally cylindrical portion 72 terminating in a tapered end portion 74. A metering bore including the axial bore 48 and the passages 50 is illustrated. The spike 42.1 is secured to the plate 34 (not shown) in the same way as the spike 42 of FIG. 1. The sleeve 60 in FIG. 3 is shown in its deformed condition.

The flange 62 serves to centre the spike 42.1 in the sleeve 60 before the point of the tapered end portion 74 penetrates the wall 70. As the tapered end portion is pushed through the wall 70, a cleaning action is exerted on the portions 72 and 74 by the wall 70, this cleaning action having the effect of sweeping dirt particles on the surfaces of the portions 72 and 74 rearwardly towards the plate 34 and thereby preventing these dirt particles from entering the bag.

Figure 4:
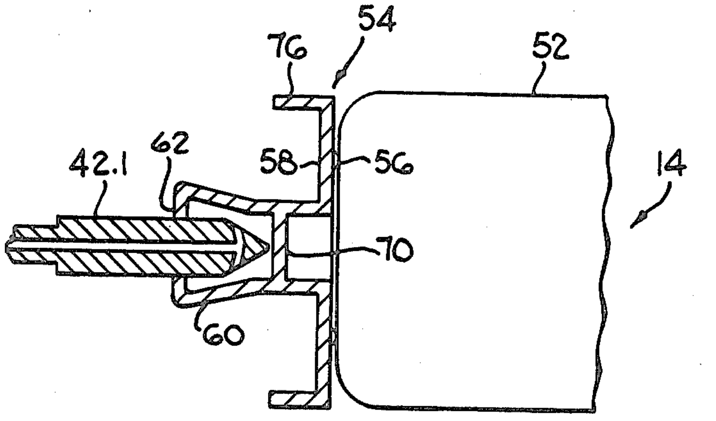
FIG. 4 is a fragmentary axial section similar to that of FIG. 3 and showing yet another form of the device.

FIG. 4 shows a modified form of the cartridge of FIG. 3. In this form, the bag 52 is heat sealed to the disc-like portion 58 along the sealing line 56 in a manner similar to that described with reference to FIG. 1. An annular stiffening flange 76 encircles the disc-like portion 58 and this assists in enabling a firm grip to be taken of the bag when it must be held for impaling on the spike 42.1.

In the embodiment of FIG. 4, the spike 42.1, after being centred by the flange 62, passes through the wall 70 and through the wall of the bag 52. Each of these walls exerts a cleaning action on the spike and, after having been penetrated by the spike, each tightly grips the spike to form an hydraulic seal. Each of these seals comes into existance immediately the spike penetrates the respective wall.

Figure 5:
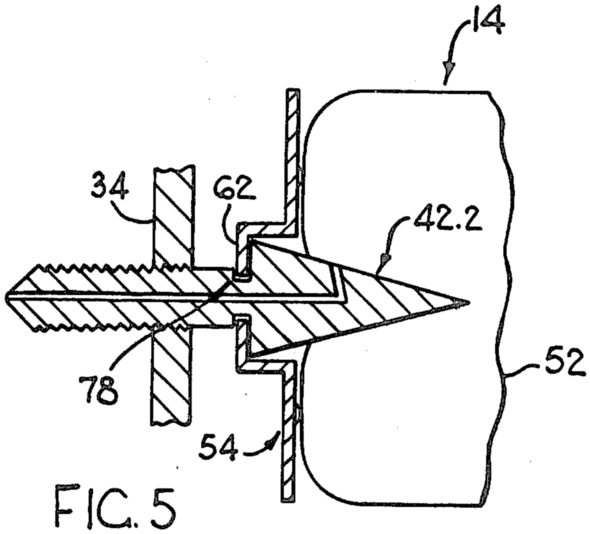
FIG. 5 is a fragmentary axial section through a further device for dosing a flowing fluid.

In the form of FIG. 5, the cartridge 14 is substantially as shown in FIG. 1 but the spike, referenced 42.2, is modified in that it includes a circumferentially extending groove 78 into which the flange 62 snaps when the cartridge is impaled thereon.

Figure 6:
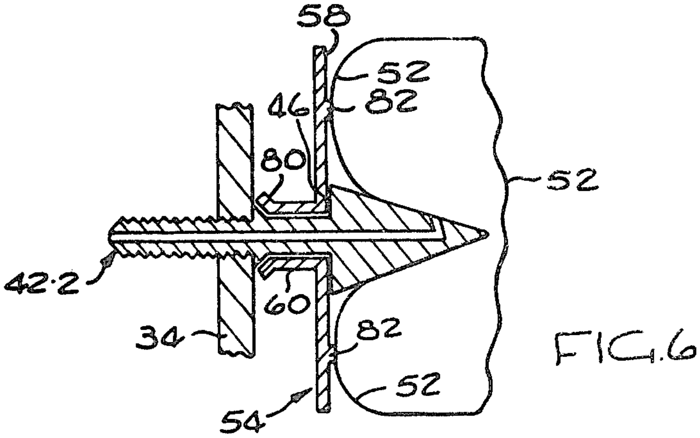
FIG. 6 is a fragmentary axial section showing a modified form of the embodiment of FIG. 5.

The arrangement of FIG. 6 is similar to that of FIG. 5 except in that the sleeve 60 includes, at the end thereof remote from the disc-like portion 58, a short frusto-conical seal 80. In this form the shoulder 46 co-operates not with the flange 62 but which the front face of the disc-like portion 58. The dimensions of the various components are such that when the disc-like portion 58 snaps-over the shoulder 46, the seal 80 is in contact with a correspondingly angled frusto-conical surface which encircles the spike 42.2 adjacent the plate 34.

In this form a raised, circular rib 82 is provided on the disc-like portion 58 to facilitate welding of the bag 52 to the disc-like portion 58.

Figure 7:
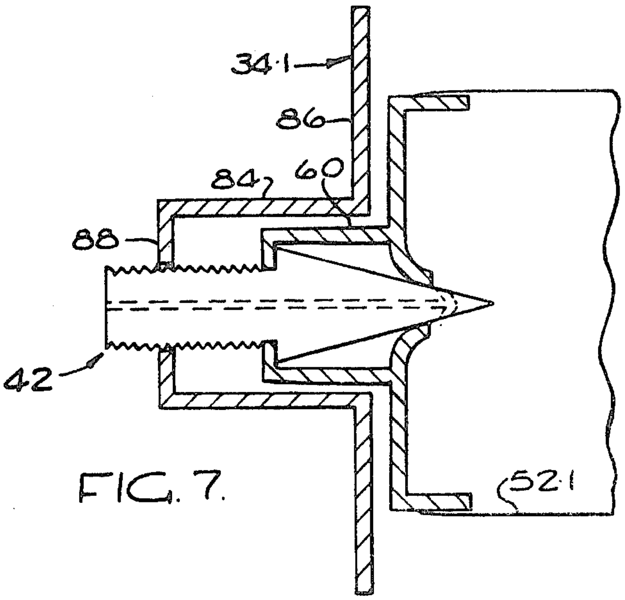
FIGS. 7 and 8 are fragmentary axial sections through other devices for dosing a flowing fluid.

In FIG. 7 the cartridge plate is shown at 34.1 and includes a central sleeve 84 located at the centre of a disc-like portion 86. An inwardly extending peripheral flange 88 is provided at the end of the sleeve remote from the disc-like portion 86. The bore defined by this sleeve is threaded and the spike 42 is screwed into the bore.

Once the cartridge has been impaled on the spike 42, the sleeve 60 of the cartridge lies co-axially within the sleeve 84 of the cartridge plate. It will be noted that the cartridge of FIG. 7 has a wall equivalent to the wall 70 of the cartridge of FIG. 3, this wall being co-planar with the disc-like portion 58 and being shown punctured by the spike 42.

Figure 8:
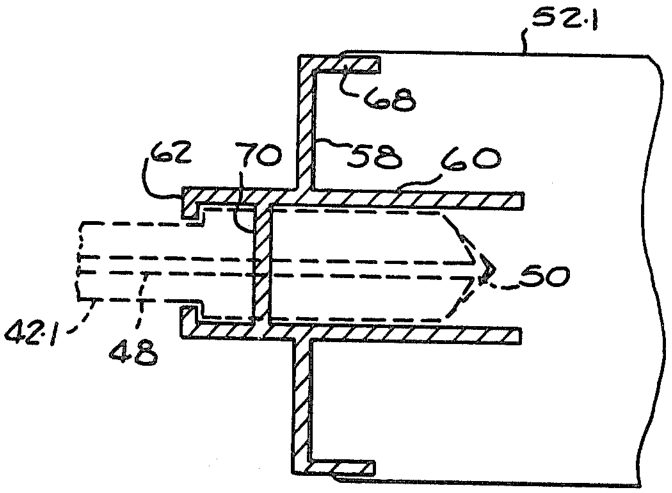

Turning finally to FIG. 8, this shows a cartridge in which the sleeve 60 extends inwardly of the disc-like portion 58. The spike, after passing through the wall 70, lies within the extension of the sleeve 60. Thus the bag, as it collapses, cannot be punctured a second time by the spike. This minimises the possibility that the bag may collapse in such a way as to be re-punctured whilst still containing a significant amount of lubricant. If it is punctured a second time then there is a chance that lubricant will be expelled into the liner 24.

The extension of the sleeve 60 inwardly can be used in conjunction with the form of FIG. 3 and with the other forms illustrated provided they are modified so that the wall of the bag does not extend across the bore of the sleeve.

The dimensions of the bore 48 and passage 50 influence the rate at which lubricant flows from the cartridge. An increase in the minimum cross-sectional area of the bore and passage results in an increase in flow rate, and a decrease in minimum cross-sectional area results in a decrease in flow rate.

I claim:

1. In combination, a device for dosing a flowing fluid with an additive and an additive cartridge, the device comprising a casing having an inlet for fluid to be dosed and an outlet for dosed fluid, a spike within the casing, the spike having a shank and a head and there being a metering bore passing through the shank and into the head, the bore opening through the surface of the head and the additive cartridge being impaled on the spike, the cartridge including a bag containing the additive and an element including a sleeve-like portion which receives the spike, and the spike and element including inter-engaging surfaces for securing the cartridge against accidental removal from the spike.

2. The combination of claim 1, where the metering bore comprises an axial bore passing through the shank and into the head and a passage intersecting said axial bore and opening through the surface of said head, the intersection between the axial bore and the passage being closer to the point of the head than the inlet to the passage on the surface of the head.

3. A device for dosing a flowing fluid with an additive, the device comprising a casing having an inlet for flowing fluid to be dosed and an outlet for dosed fluid, a spike within the casing, the spike having a shank and an enlarged, pointed head, there being a metered bore passing through the shank and into the head, the bore opening through the surface of the head, and an annular shoulder encircling the spike where the shank joins the head, said shoulder forming the rear face of the head, the shank being mounted on a plate which forms one end wall of a liner located within the casing, there being a gap between the liner and the casing which gap forms the main fluid flow path through the device.

4. A device according to claim 3, in which the casing and liner are both cylindrical and said gap is also cylindrical.

5. A device according to claim 3 or 5, in which said plate is disc-like with an annular gap between its outer periphery and the inner wall of the liner.

6. A device according to claim 3 or 4, in which the other end of the liner is closed by a perforated plate.

7. A device according to claim 3 or 4, in which a sealing plate encircles the shank and a spring is provided for urging the sealing plate towards the shoulder.

8. A device according to claim 3 or 4, in which said metering bore comprises an axial bore passing through the shank and into the head and a passage intersecting said axial bore and opening through the surface of said head, the intersection between the axial bore and the passage being closer to the point of the head than the inlet to the passage on the surface of the head.

9. A cartridge which comprises a bag for containing additive and an element secured to the bag, the element including a sleeve for receiving and guiding a spike onto which the cartridge is impaled during use, said element further including a disc-like portion to which the bag is secured along a circular line which encircles the sleeve, the material forming the wall of the bag extending across the bore of the sleeve.

10. A cartridge according to claim 9, in which said sleeve is open at both ends, there being a radially inwardly directed flange at the end of the sleeve remote from the bag.

11. A cartridge according to claim 9, in which there is a transverse wall forming part of said element, the transverse wall being intermediate the ends of the sleeve.

12. A cartridge according to claim 9, in which said sleeve is provided, bag at the end thereof remote from said bag with a sealing portion of frusto-conical form for co-operation with a similarly shaped surface of a spike on which the cartridge is impaled.

13. A cartridge which comprises a bag for containing additive and an element secured to the bag, the element including a sleeve for receiving and guiding a spike onto which the cartridge is impaled during use, said element further including a disc-like portion, said bag being secured to a peripheral flange which encircles the outer edge of said disc-like portion.

14. A cartridge according to claim 10, 13, in which said sleeve extends within said bag.

15. A method of dosing a flowing fluid which comprises the steps of:

(a) impaling an additive cartridge on a spike the cartridge comprising a bag secured to an element which element includes a sleeve, and impaling being effected by passing the spike through said sleeve so that the spike penetrates the cartridge;

(b) providing on said sleeve and said spike co-operating surfaces which inter-engage to restrain the cartridge against accidental detachment from the spike;

(c) placing the spike and cartridge within a casing having an inlet for fluid to be dosed and an outlet for dosed fluid;

(d) causing flowing fluid to impinge on the bag so as to flatten the bag and thereby force additive from the bag through an outlet path provided therefor through said spike.

* * * * *

Disclaimer 4,212,373.—*Edgar Peter Scragg,* Florida, Transvaal Province, South Africa. DOSING A FLOWING FLUID. Patent dated July 15, 1980. Disclaimer filed Apr. 6, 1981, by the inventor.

Hereby enters this disclaimer to claims 9, 10 and 12 of said patent.

[*Official Gazette June 9, 1981.*]